United States Patent [19]

Neff

[11] Patent Number: 5,205,891
[45] Date of Patent: Apr. 27, 1993

[54] METHOD FOR MANUFACTURING AN EXPANDABLE COLLAPSIBLE PRODUCT

[75] Inventor: Craig A. Neff, Golden, Colo.

[73] Assignee: Hunter Douglas, Inc., Upper Saddle River, N.J.

[21] Appl. No.: 447,287

[22] Filed: Dec. 7, 1989

Related U.S. Application Data

[60] Division of Ser. No. 229,381, Aug. 5, 1988, Pat. No. 4,943,454, which is a continuation-in-part of Ser. No. 90,766, Aug. 28, 1987, Pat. No. 4,861,404.

[51] Int. Cl.⁵ .................... B32B 31/08; B32B 3/12
[52] U.S. Cl. .................... 156/204; 156/292; 160/84.1; 428/118; 428/188
[58] Field of Search .............. 156/197, 204, 308.4, 156/292; 428/188, 116, 118; 160/84.1

[56] References Cited

U.S. PATENT DOCUMENTS

| | | | |
|---|---|---|---|
| 1,937,342 | 11/1933 | Higbie . | |
| 2,082,323 | 6/1937 | Bussey | 493/109 |
| 2,201,356 | 5/1940 | Terrell . | |
| 2,254,820 | 12/1940 | Donner | 160/84.1 |
| 2,670,314 | 2/1954 | Ungar | 156/197 |
| 2,874,612 | 2/1959 | Luboshez | 350/263 |
| 3,294,605 | 12/1966 | Fischer | 156/292 |
| 3,384,519 | 5/1968 | Froget | 156/292 |
| 3,515,036 | 6/1970 | Takehiro et al. | 156/197 X |
| 3,574,031 | 4/1971 | Heller | 156/272.2 |
| 3,887,418 | 6/1975 | Jurisich | 156/197 |
| 3,961,119 | 6/1976 | Thomas | 156/205 |
| 4,069,857 | 1/1978 | Brookshire | 160/84.1 |
| 4,288,485 | 9/1981 | Suominen | 428/116 |
| 4,346,132 | 8/1982 | Cheng et al. | 428/76 |
| 4,388,354 | 6/1983 | Suominen | 428/116 |
| 4,433,728 | 11/1984 | Bauernfeind | 156/209 |
| 4,535,828 | 8/1985 | Brockhaus | 160/84.1 |
| 4,607,783 | 8/1986 | Mansbridge et al. | 156/197 X |
| 4,625,786 | 12/1986 | Carter | 160/84.1 |
| 4,673,600 | 6/1987 | Anderson | 160/84.1 X |
| 4,677,012 | 6/1987 | Anderson . | |
| 4,677,013 | 6/1987 | Anderson . | |
| 4,685,986 | 8/1987 | Anderson . - | |
| 4,795,515 | 1/1989 | Kao et al. | 156/197 |
| 4,861,404 | 8/1989 | Neff | 156/204 |
| 4,884,612 | 12/1989 | Schnebly et al. | 160/84.1 |
| 4,974,656 | 12/1990 | Judkins | 160/84.1 |

FOREIGN PATENT DOCUMENTS

| | | |
|---|---|---|
| 0227247 | 10/1986 | European Pat. Off. . |
| 1949823 | 10/1969 | Fed. Rep. of Germany . |
| 1557304 | 8/1969 | France . |
| 756270 | 9/1956 | United Kingdom . |

Primary Examiner—Michael W. Ball
Assistant Examiner—Michele K. Yoder
Attorney, Agent, or Firm—Gary M. Polumbus

[57] ABSTRACT

An expandable collapsible product is made by providing a pleated sheet (8,10) having legs (20) which are made by securing two parts of a fold (17) together. Two sheets are combined by securing the end of a leg (20) to a crease (16) or a leg (20) of an opposite sheet. The sheet material is folded to preferably provide alternating taller folds (17) and shorter folds (16), and the taller folds are modified to provide the legs (20) by gluing parts of the taller folds (17) together. Gluing is accomplished by moving glue heads across the sheet at high velocity through the use of linear motors. The glue lines are heated after being laid down by the use of electromagnetic radiation, preferably from a high-powered laser. The finished product is used as insulated window coverings, or the like.

11 Claims, 6 Drawing Sheets

METHOD FOR MANUFACTURING AN EXPANDABLE COLLAPSIBLE PRODUCT

CROSS REFERENCE TO RELATED APPLICATIONS

This application is a division of application Ser. No. 07/229,381, filed Aug. 5, 1988, now U.S. Pat. No. 4,943,454, which application was a continuation-in-part of application Ser. No. 07/090,766, filed Aug. 28, 1987, now U.S. Pat. No. 4,861,404.

This invention relates to an expandable, collapsible product for use as a window shade and methods and apparatus used in the manufacture thereof.

Known products of this type generally comprise folded sheets with selected folds connected to provide an elongated hollow channel. For example, U.S. Pat. No. 4,450,027 shows a honeycomb material wherein a plurality of elongate tubes are stacked on top of each other and secured by adhesive to provide a hollow window covering.

Similar products are shown in U.S. Pat. Nos. 4,603,072 and 4,631,108. Another type of construction which produces a hollow article is shown in U.S. Pat. No. 4,685,986 wherein two folded sheets are secured together at selected creases to produce the final product. Other disclosures of honeycomb structures may be found in U.S. Pat. Nos. 4,631,217; 4,676,855; 4,677,012 and 4,677,013.

The structure of a honeycomb product is important with respect to the methods and apparatus required for its manufacture. U.S. Pat. No. 4,685,986 describes a manufacturing technique wherein folded sheets of material are advanced toward each other while a centrally-located apparatus attaches selected creases of the two sheets to hold the sheets together and produce the product. U.S. Pat. No. 4,450,027 shows another technique which is to produce a single elongate tube which is wound around itself after adhesive is applied to provide an oblong coil of the hollow tubular element. The ends of the coil are then cut off leaving the center sections as the finished product.

According to one aspect of the present invention, there is provided a method of manufacturing an integral expandable, collapsible product having a row of parallelly arranged, transversely extending hollow cells therein, comprising the steps of folding a first and a second sheet of flexible material to provide a plurality of first transverse creased pleats therein, said first pleats projecting to one side of the first sheet and to one side of said second sheet respectively, folding the first sheet and the second sheet to provide a plurality of second folds or pleats therein, each of said folds projecting to the other side of said first sheet and said second sheet respectively between two of said first transverse creased pleats, modifying at least certain of the second folds of the first sheet by securing parts of the folded material together to form first legs, positioning said first and second sheets, so that the other side of said first sheet faces the other side of said second sheet, and combining said first and second sheets so that said first legs are each secured to a separate fold of said second sheet.

Such a method can be far more economical to carry out and allows for great versatility in the final construction of the product.

Depending on the form of structure which it is intended to provide, each of the second folds or pleats of the first sheet may be so modified as to form a first leg or only certain of these folds or pleats of the first sheet may be modified to form a first leg. If this is done, the second pleats formed in the first sheet may be given a lesser height than the first legs formed in the first sheet.

In a similar way to the first sheet, at least certain of the folds of the second sheet may be modified by securing parts of the folded material together to form second legs and, when said first and second sheets are combined, said second legs may each be secured to a separate fold of the first sheet. It is also contemplated that the second transverse folds or pleats in the second legs of the second sheet are formed alternately in a predetermined order and that the second pleats should be given a lesser height than the second legs.

The second legs may be utilized in a number of different ways. For example, the second legs can be attached to the second transverse pleats in the first sheet. Alternatively, they can be attached to first legs of the first sheet, in either event forming the separation between two adjacent transverse cells. It will be appreciated that the free edge of a first leg or a second leg can contact the free edge of the second leg or a first leg respectively, or the free edge of a pleat or fold on the other sheet. If the legs of the first sheet are joined to the legs of the second sheet, the legs may be the same length. In any of these arrangements, however, the separation between the two cells is formed by two thicknesses of sheet material only.

The folds may be modified to produce the legs, by placing the line of adhesive in the folds and pressing the parts together. The step of securing the legs may comprise placing a line of adhesive along the contact line of a first or second leg and/or along the relevant line of the other sheet and heating the line with adhesive. If the adhesive is a hot melt adhesive, the step of heating may comprise irradiating the adhesive with an electromagnetic radiation, preferably with a laser beam forming a line of the adhesive. The first and second sheets may be identical and consist of pieces of one and the same sheet of material manufactured by the same machine or machines and it is also possible that, while they are cut from one sheet, the first and second sheets are oppositely positioned in mirror-like fashion, with the first and second legs facing each other either in aligned or offset positions at the location where the first and second sheets combine and are mutually secured.

According to another aspect of the present invention there is provided an expandable collapsible product e.g. for forming a window covering and having an integral row of parallelly arranged, transverse, hollow, cross-sectionally closed cells, comprising a continuous first and second sheet, each sheet having a plurality of first transverse creased pleats on one side of the sheet and a plurality of transverse continuous projections on the other side of the sheet, said first and second sheets being fixedly secured together at the free edges of the projections of the first and second sheets along the length thereof, so that a portion of the circumference of a cell, invisible from the front or back of the finished product and common to two immediately adjoining cells, comprises a single layer of sheet material, formed by doubling said sheet material back on itself and securing it together.

For the best visual effect, the first and second sheets are preferably made from an opaque or semi-opaque material.

The invention further contemplates apparatus for providing, in an elongate sheet of material, transverse pleats of at least two different heights, said apparatus comprising knife edge means extending across said material, pleat bar means for engaging said material and urging said material against said knife edge means during a forward motion of said pleat bar to form a pleat, and means for controlling the motion of said pleat bar means, to cause said pleat bar means to move alternatively first and second distances from said knife edge during rearward motions whereby said pleats of two different heights are formed.

The means for controlling the motion of the pleat bar may comprise a cam having differently sized lobes thereon and heater means may be provided to heating the material, these including a bottom discharge heater for heating the lower surface of the material after it has been pleated and this may be in the form of a flat stone, e.g. of granite.

The invention further contemplates apparatus for securing together two parts of a fold in a length of elongate, transversely pleated sheet material, said apparatus comprising means for advancing said piece of material, jaw means for receiving said fold and for pressing said parts together and adhesive applying means for pressing adhesive in said fold before said jaw means presses said parts together.

According to yet another aspect of the invention, there is provided apparatus for combining first and second lengths of transversely pleated material, said apparatus comprising means for advancing said first and second sheets towards each other, indexing means for engaging respective first pleats in each of said first and second sheets and for establishing a predetermined relative position between said first and second sheets, means for positioning respective second pleats in each of said first and second sheets in a predetermined relative position, and means for placing a line of adhesive on said second pleats to secure said first and second sheets together.

The invention also proposes apparatus for controlling the feed of a sheet of material comprising, two laterally spaced support posts, a toothed rack on each post, first and second carriages each mounted on a respective post for movement along said posts, a shaft connecting said carriages, said shaft having pinions at opposite ends for engaging respective ones of said racks, and roller means for engaging said material and applying tension thereto.

Also contemplated is apparatus for gluing two articles together comprising hot melt adhesive dispensing means, track means for carrying said dispensing means, and electromagnetic means for irradiating hot melt adhesive after it has been dispensed by said dispensing means, wherein said electromagnetic means is preferably in the form of a laser.

In order that the invention may more readily be understood, the following description is given, merely by way of example, reference being made to the accompanying drawings, in which.

Figure 1:
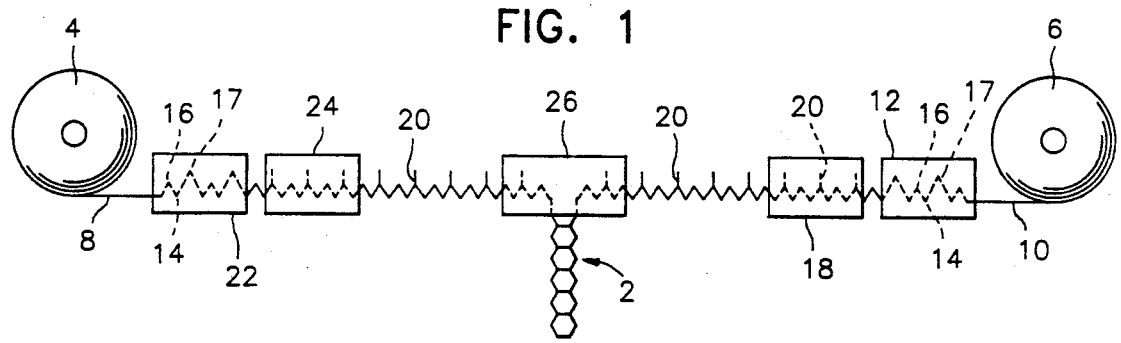
FIG. 1 is a schematic view of one method for assembling one form of product in accordance with the invention.

FIG. 1 is a schematic diagram of a method for forming an expansible, collapsible product 2 in accordance with the invention. The product is formed by the combination of two sheets of opaque or semi-opaque fabric, and these sheets are supplied from rolls 4 and 6 at opposite ends of an assembly for manufacture of the expansible collapsible product 2. A first sheet of fabric 8 from roll 4 and a second sheet of fabric 10 from roll 6 are preferably subjected to identical treatments so that two substantially identical sheets are combined to produce the product 2. It will be appreciated, however, that other products may be manufactured by subjecting sheets 8 and 10 to different treatments and that a product similar to the product produced by the method of FIG. 1 may be made by combining two sheets which have been subjected to different treatments.

The first sheet 8 and the second sheet 10 are passed through pleating machines 22 and 12 respectively, these providing first pleats 14 on one side of each sheet, and second pleats 16, 17 on the other side of each sheet. The pleats 17 are formed to be longer than the pleats 16 (see FIG. 11). Preferably, fabric 10 is a polyester which maintains a crease 32 when folded in the presence of heat, and this process will be described more fully below. After the pleating operation, sheet 10 is passed through a modifier 18 and sheet 8 through a modifier 24, to modify the second pleats 17 to provide legs 20. The process for forming legs 20 will be described more fully below, but at this point it may be noted that legs 20 are formed by securing two parts of the larger pleats together.

The pleated and modified sheets 8 and 10 are combined in an indexing and joining machine 26, and the finished product 2 exits downwardly.

Figure 11:
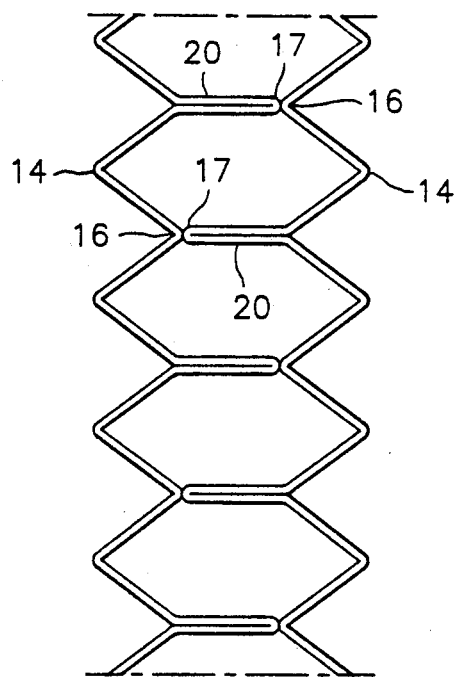
FIGS. 11 to 13 are each a schematic cross-section of several embodiments of expansible, collapsible product according to the invention.
Figure 12:
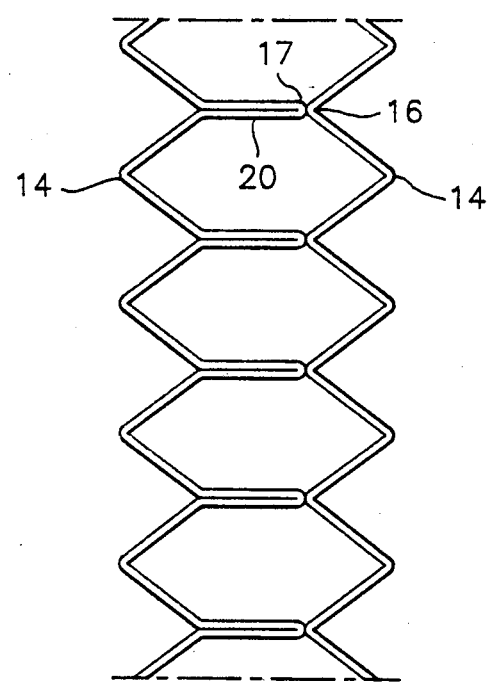
Figure 13:
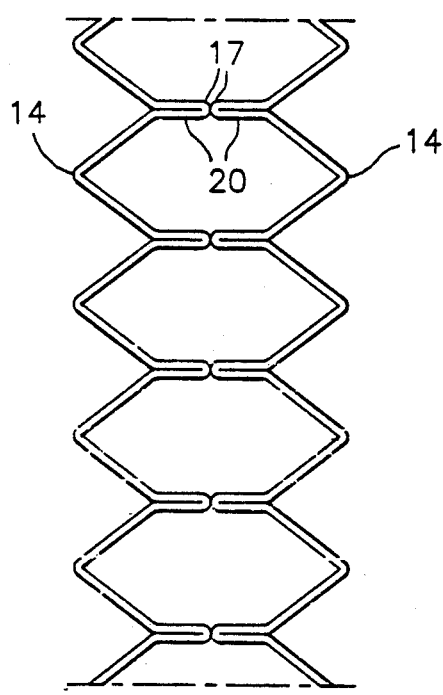

FIGS. 12 to 13 show modified structures of the expandable collapsible product of the invention, which can be made by relatively minor alterations to the method and apparatus described. While in FIGS. 1, 2 and 11, alternate second pleats 17 are made larger than the other second pleats 16, for both of the sheets 8 and 10, in FIG. 12, all of the second pleats 17 of the first sheet are made larger than all of the second pleats 16 of the second sheet 10. These second pleats 17 are modified to form first legs 20, as before, but none of the shorter pleats 16 of the second sheet 10 are modified.

In the construction shown in FIG. 13, all of the second pleats 17 of the first sheet 8 and of the second sheet 10 are made longer than the first pleats 14, but not as long as in FIGS. 11 and 12, and the longer second pleats 17 are all modified to form first and second legs 20 which are of the same length as each other and abut in the center.

It will observed that in each of these constructions the separation between two adjacent cells formed by two thicknesses of sheet material over the full length of this separation.

Figure 2:
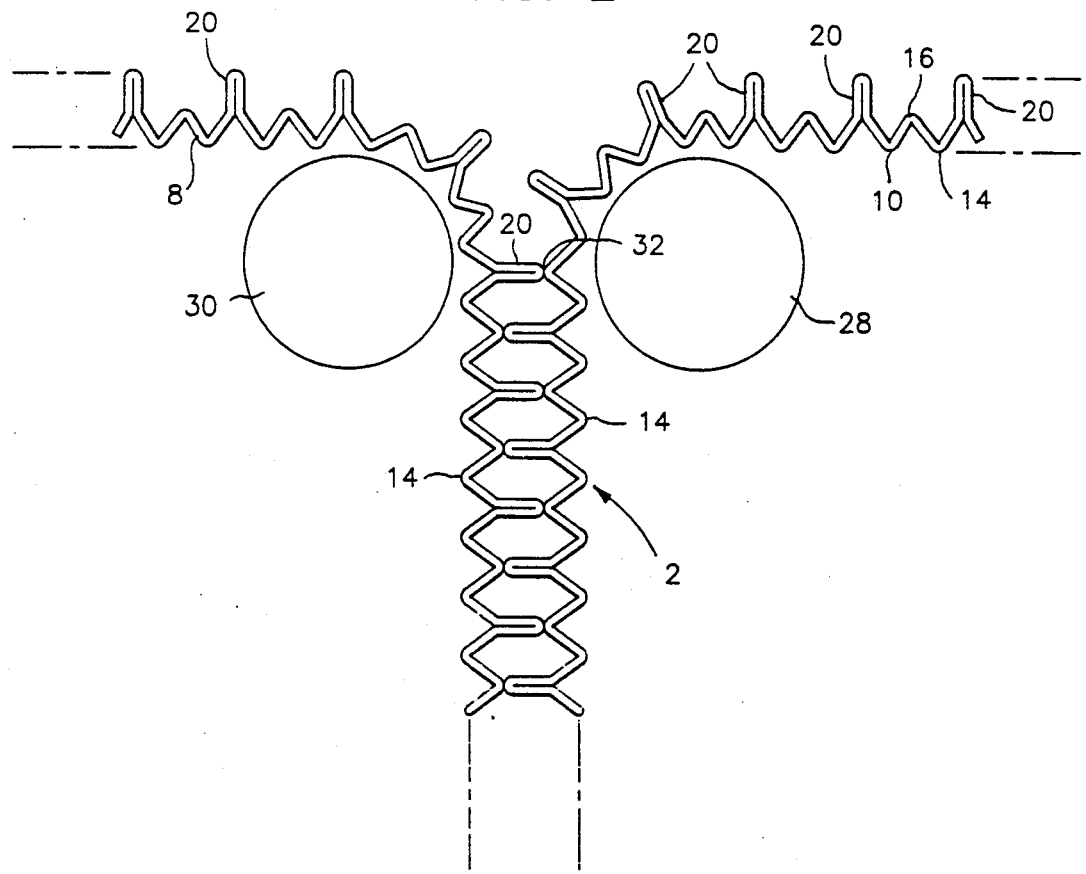
FIG. 2 is a schematic diagram of a mechanism for securing two sheets of pleated material to form a product in accordance with the invention.

FIG. 2 is a schematic enlargement of the indexing and joining operation carried out in machine 26. Indexing jaws 28 and 30, shown only schematically, are placed on opposite sides of a gap into which modified sheets 8 and 10 are fed. Jaws 28 and 30 perform an indexing function whereby the creases in sheets 8 and 10 are aligned. Then, a plate which will be described more thoroughly with respect to FIG. 9 engages a loose leg 20 and moves it into position adjacent a shorter second pleat 16 such as shown at 32 in FIG. 2, and a cementing operation takes place to join the end of leg 20 to the crease 32.

Figure 3:
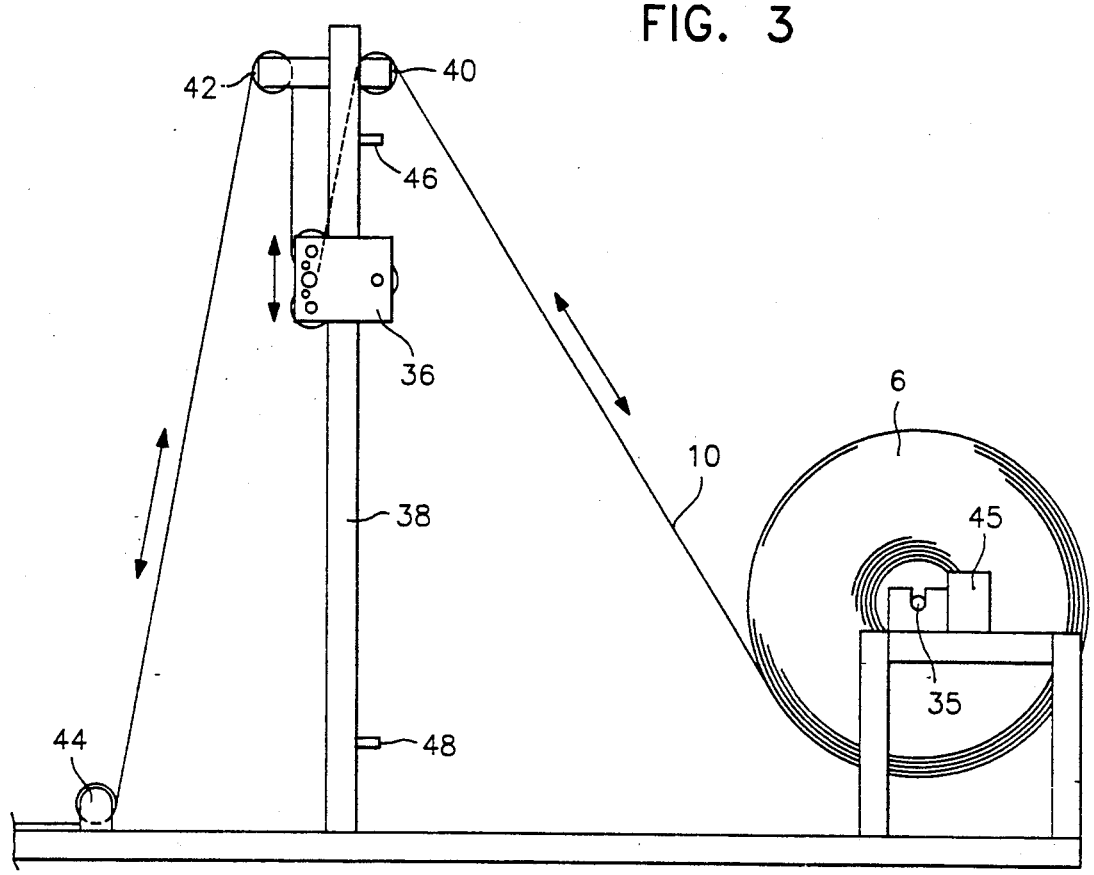
FIG. 3 is a side view of a material-feeding apparatus in accordance with the invention.

With reference to FIG. 3, the preferred apparatus for supplying material will be described. A roll 6 of material 10 is supported on an axle 35 mounted on a stand 34. A movable carriage 36 is mounted on a post 38, and an identical laterally spaced structure is on an opposite side of the apparatus but cannot be seen in FIG. 3, because they are directly behind the carriage 36 and the part 38 which can be seen. Material 10 is fed from roll 6 over a roller 40, under a roller 54 (FIG. 4) mounted between the two carriages 36, and over a second roller 42. The material is then passed under a roller 44 for providing a repair walkway, and the material is then directed into a pleater which will be described with respect to FIGS. 5 and 6.

Rotation of roll 6 is controlled by a motor 45 which includes a geared shaft which engages a gear on the axle 35 supporting the roll of fabric. Carriage 36 is provided with a predetermined weight which will in turn place a predetermined tension on sheet 10. As the material is fed into the pleating machine, carriage 36 moves upwardly because motor 44 prevents rotation of roll 6 during this period. When carriage 36 reaches an uppermost position, a sensor 46 causes motor 44 to allow roll 6 to unwind, thus allowing movable carriage 36 to move downwardly. When carriage 36 reaches the bottom of post 38, sensor 48 is activated, and motor 44 is instructed to secure roll 6 from further operation. It will be appreciated that this operation maintains a constant tension on sheet 10 which allows the subsequent operations to be accurately controlled.

Figure 4:
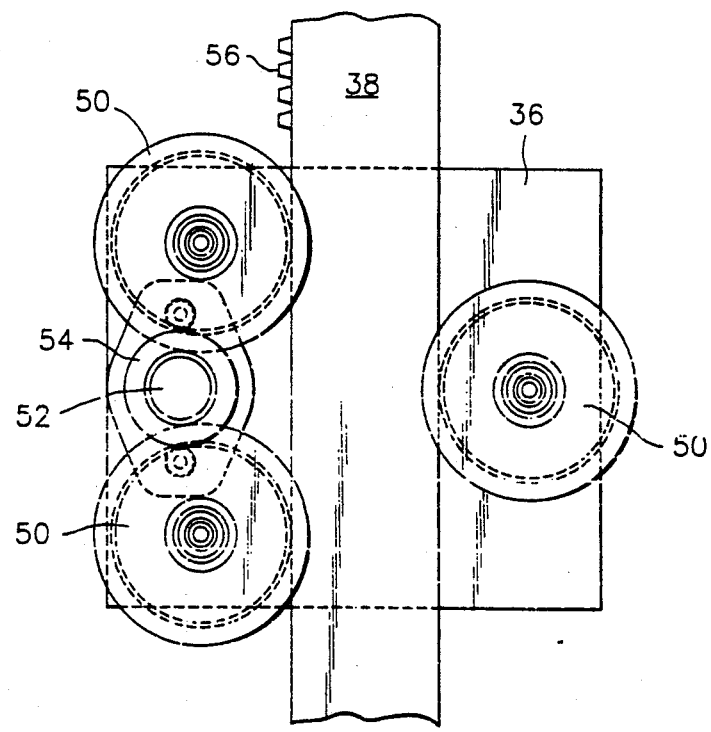
FIG. 4 is a side view of a tensioning apparatus shown in FIG. 3.

A unique feature of the mechanism shown in FIG. 3 is shown more clearly in FIG. 4. The two carriages 36 have mounted thereon three rollers 50. These rollers engage the respective post 38 to allow smooth, even movement of carriage 36 along post 38. A shaft 52 extends across the width of the feeding apparatus to the other carriage and carries the roller 54, which is mounted for free rotation about shaft 52 and also extends substantially across the width of the feeding apparatus. Sheet 10 passes under roller 54 as shown in FIG. 3. A gear (not illustrated) is fixed to each end of shaft 52 and engages a toothed rack 56 which is secured on each post 38; the racks are adjusted so that the teeth are in level alignment. Thus, carriage 36 on one side of the material feeding apparatus moves exactly in the same manner as does the similar carriage on the opposite side of the material feeding apparatus. This causes the material 10 to be fed evenly into the pleater.

Figure 5:
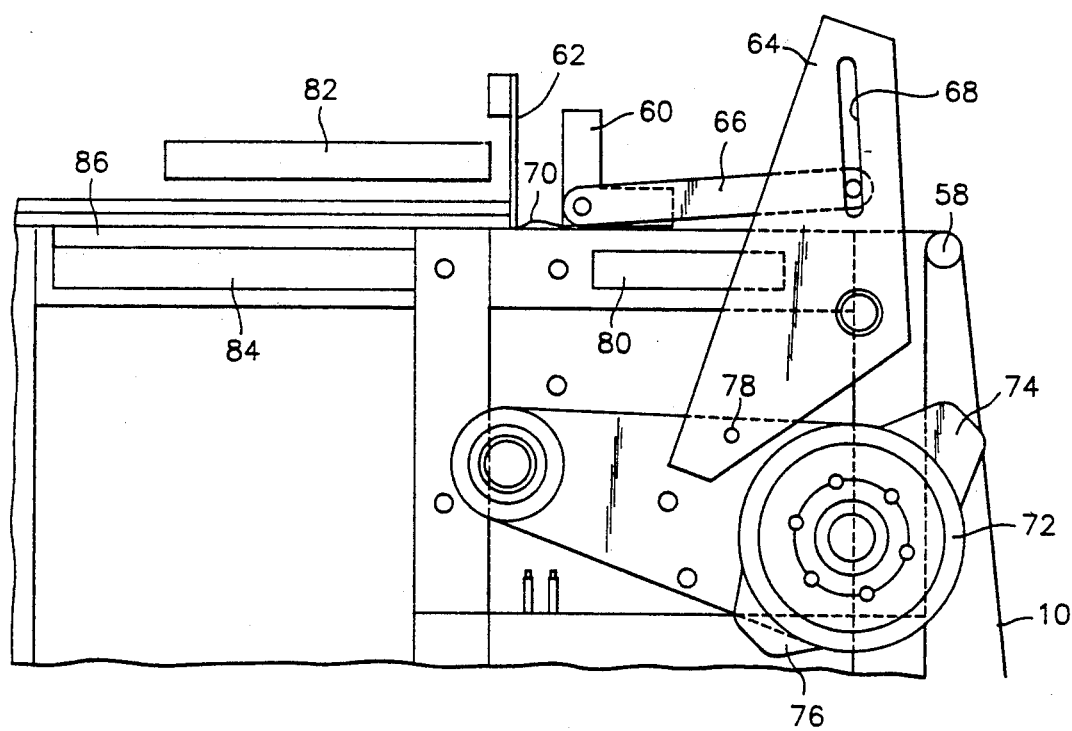
FIG. 5 is a schematic diagram of a pleating machine in accordance with the invention.

The pleater 12 (which is a mirror image of pleater 22) will be described with respect to FIGS. 5 and 6. Material 10 is directed into the pleating machine by passing over a roller 58, is fed under a pleating bar 60, and is held by a knife edge 62. The pleating bar 60 is caused to reciprocate by the motion of a plate 64 which is connected to the pleating bar 60 by a link 66. A slot 68 permits adjustment of the location of the link with respect to plate 64. The general use of a pleating bar 60 to cooperate with knife edge 62 to form pleats is known in the art, and the apparatus shown in FIG. 5 is a modification of a pleating machine manufactured by Enguda of Taiwan.

Sheet 10 passes under pleating bar 60 and engages a part of the bar so that as the pleating bar moves forwardly toward knife 62, sheet 10 is folded upwardly, such as at 70 to form a fold or pleat. As pleating bar 60 moves closer to knife edge 62, fold 70 becomes tightly compressed to make a straight crease. Then, knife edge 62 moves upwardly to allow the fold to move to the far side of knife edge 62, pleating bar 60 moves in a rearward direction and then moves toward knife edge 62 again to create a subsequent fold. As shown, the pleating machine provides folds of alternately varying heights so that legs 20, are described with respect to FIGS. 1, 2 and 11 may be provided.

The prior art machine is modified to include a cam 72 having lobes 74 and 76 thereon. When taller lobe 74 engages cam follower 78 on plate 64, pleating bar 60 is caused to make a large rearward motion, thus creating a large fold during the forward motion. When cam follower 78 engages a shorter lobe 76, pleating bar 60 moves a shorter distance rearwardly and thus forms a shorter fold during the forward motion.

It will be appreciated that cam plate 72 causes rearward motions of pleating bar 60 of different lengths to provide pleats of different heights.

Figure 6:
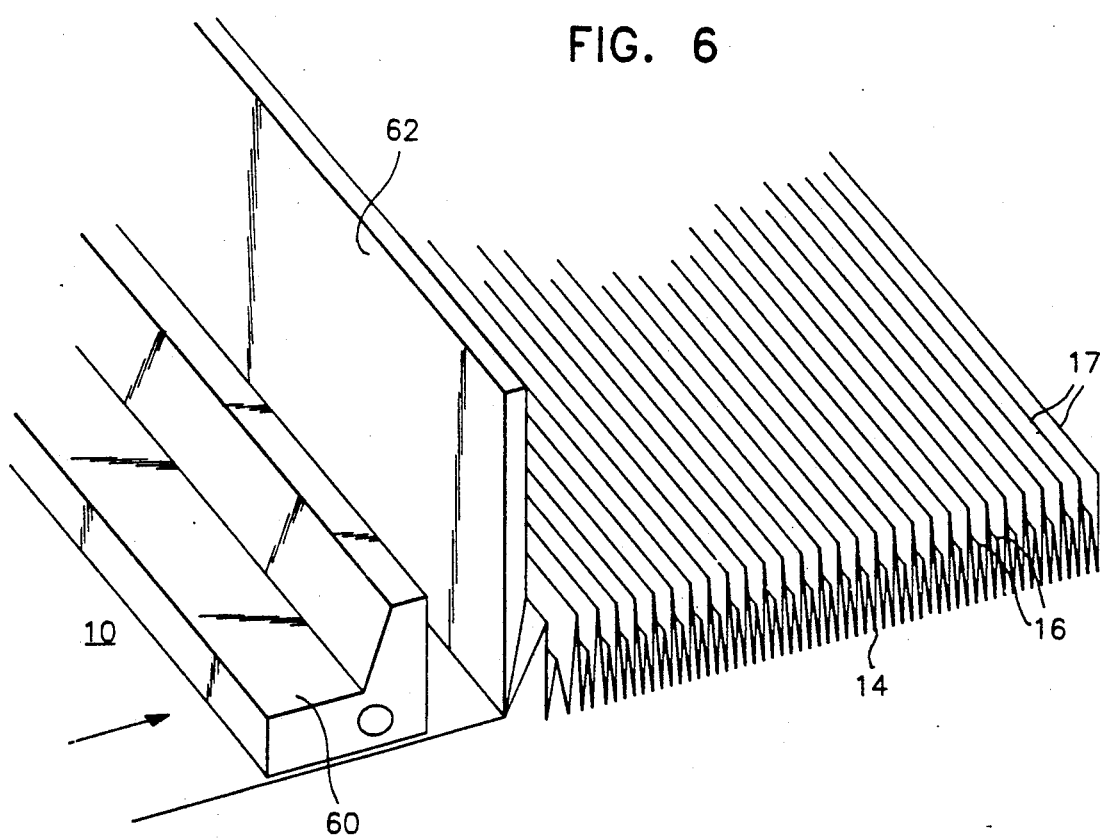
FIG. 6 is a schematic perspective of a portion of the pleating machine shown in FIG. 5.

The end product of the described motions of pleating bar 60 may be seen with more clarity in FIG. 6. Folds 17 are taller than folds 16, the smaller folds 16 being formed by shorter rearward movements of pleating bar 60 and the taller folds 17 being formed by larger rearward movements pleating bar 60.

The preferred material to be pleated is a polyester material which is capable of heat-setting. Thus, a front heater 80 is provided to heat the material 8 and 10 prior to being folded, and top discharge heater 82 and bottom discharge heater 84 are placed in the discharge region to provide additional heat at the locations of the creases to set thoroughly the folds in the material to form permanent pleats.

It is desirable that the folds or pleats have straight crease lines, and in the preferred embodiment, a plate 86 is used between the bottom discharge heater and the lower surface or the folded material to transmit heat to the material. This plate is preferably a piece of granite approximately 25 mm thick which, it has been discovered, provides a flat, non-warping surface with a high heat capacity which delivers exceptional results in the pleating process.

Figure 7:
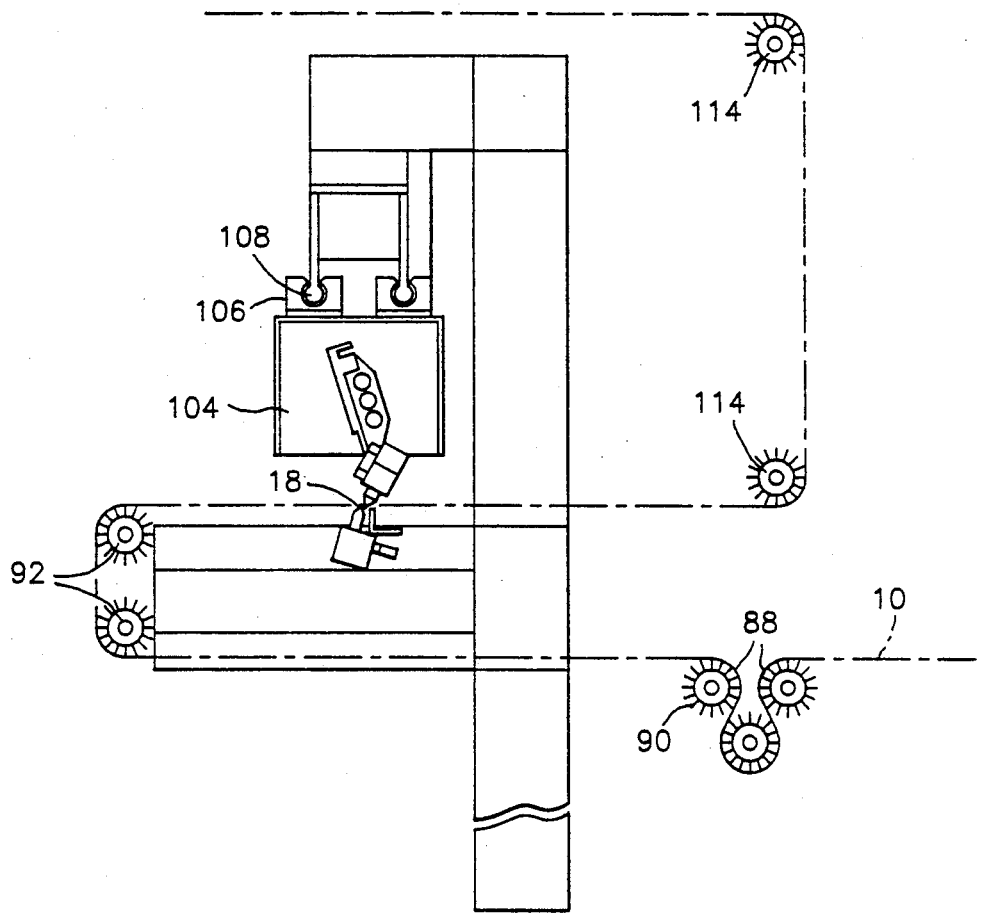
FIG. 7 is an end view of a machine for modifying the pleated fabric in accordance with the invention.
Figure 8:
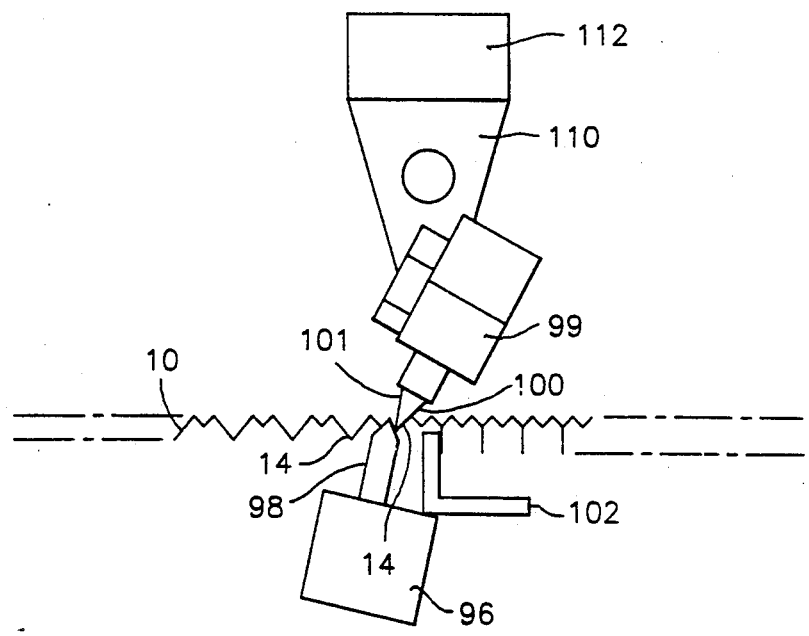
FIG. 8 is an end view of an adhesive applying apparatus for use with the apparatus of FIG. 7.

After the material has been pleated as shown in FIG. 6, it is subjected to a modifier 18, 24 which produces legs 20. A preferred form of a modifier is shown in FIG. 7. Pleated material 8 or 10 is fed into the modifier by drive rollers 88, which have elongate plates 90 for engaging folds of the material being fed. This allows the material to be fed into the machine with great precision so that individual folds 17 may be modified. The passage of material 10 around rollers 88 is shown only schematically in FIG. 7. After leaving rollers 88, the material 10 passes around rollers 92 and is then fed into a modifying apparatus 18, which, as shown in FIG. 8, includes a vacuum box 96 and a pair of jaws 98 and 100. Material is fed into the gap between opened jaws 98 and 100 by the rollers, and when a large fold 17 is in location between the jaws 98 and 100, a vacuum is applied to the vacuum box 96 to pull the fold into the desired location between the jaws. Then, a glue dispenser 99 is activated to deposit a line of hot-melt adhesive 101 in a predetermined location inside the fold 17. After the glue has been deposited, and before it cools, jaw 100 is caused to pivot by actuator 102 whereby it presses two parts of fold 17 together until adhesive 101 cools. Then, rollers 88 and 92, and other rollers in the system, are activated to advance the sheet until a subsequent large fold 17 is placed in the gap between jaws 98 and 100, and the process continues. After this operation, legs 20 described with respect to FIGS. 1 and 2 have been formed.

FIG. 7 shows a preferred orientation of glue dispenser 99 as being mounted on a mounting plate 104 which is in turn supported by bearings 106 which engage rails 108. A motor is then activated to drive mounting plate 104 and glue dispenser 99 in a linear direction along the fold 17 to deposit the line of glue 101.

A preferred arrangement is shown in FIG. 8 wherein the glue dispenser 97 is carried by a movable plate 110 of a linear motor 112, the use of which is highly advantageous because of its lack of vibration and its high speed. By the use of the apparatus shown in FIG. 8, a straight line of adhesive 101 is rapidly placed in the desired location between the parts of fold 17.

Figure 9:
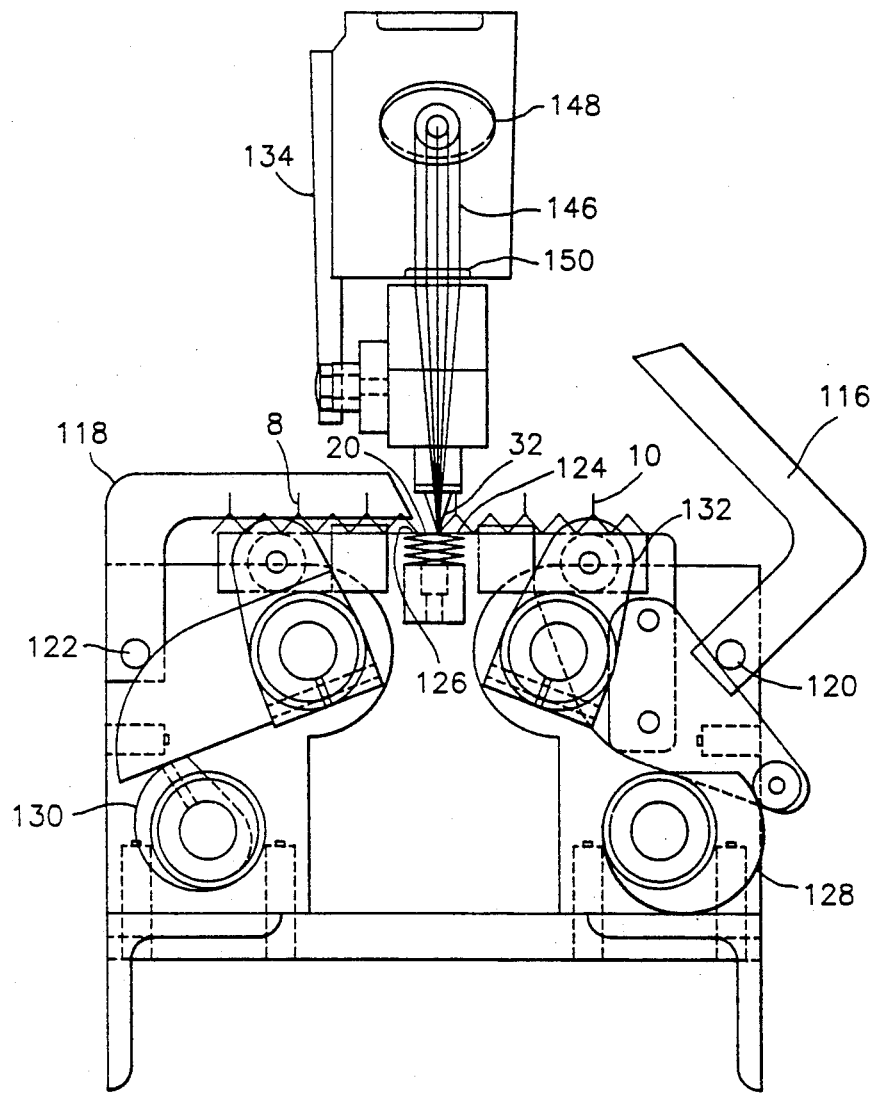
FIG. 9 is an end view of a machine for securing two sheets together using the process shown in FIG. 2.

After the sheet 10 has emerged from the gluing station, it passes around subsequent rollers 114 which direct it to an indexing and joining machine 26. As shown in FIG. 8, the second sheet 10 is directed into the indexing and joining machine from the right, and the first sheet 8 is directed into the machine from the left. Arms 116 and 118, which are generally U-shaped in plan, are pivotally mounted for rotation about respective pivots 120 and 122. As the sheets 8 and 10 are advanced through the indexing and joining apparatus, arms 116 and 118 are raised to allow the material to be advanced. Indexing jaws 124 and 126 engage respective pleats of sheets 8 and 10 to position the sheets accurately with respect to each other whereby a leg 20 may be secured to a crease 32 as described above with respect to FIG. 2. After the jaws 124 and 126 have accurately positioned the two sheets, one of the arms 116 or 118 is pivoted downwardly to a position as shown in FIG. 9 whereby a leg 20 is engaged and held in a position wherein its remote end abuts a crease 32. During this operation, the other arm is in a raised position, the other arm being pivoted downwardly during the next operation in sequence, while the first arm is raised. In this manner, the alternate legs are alternately pressed into the proper position by arms 116 and 118 operating in sequence. The arms are preferably pneumatically operated, but other mechanisms may be employed.

Jaws 124 and 126 are controlled by cams 128 and 130, only one pair of the cams being shown in FIG. 9. These cams operate two mechanisms, one of which carries a jaw 124 or 126. A first cam 130 causes a jaw mounting block 132 to move outwardly, while the second cam 128 causes the jaw to pivot with respect to the mounting block 132. Thus, the jaw 124 or 126 moves in a somewhat elliptical path so that it engages individual creases of the sheets 8 and 10 to bring the sheets into a desired alignment.

As noted, when the sheets are in the desired alignment, an arm 116 or 118 pivots downwardly to urge leg 20 into a position such that one end of leg 20 is immediately adjacent a crease 32. Then, a line of hot-melt adhesive is placed at the junction of the end of leg 20 and the crease 32 to provide a butt joint between the two. The glue is applied by an apparatus shown schematically at 134 of FIG. 9, and the preferred gluing apparatus is shown in more detail in FIG. 10.

Figure 10:
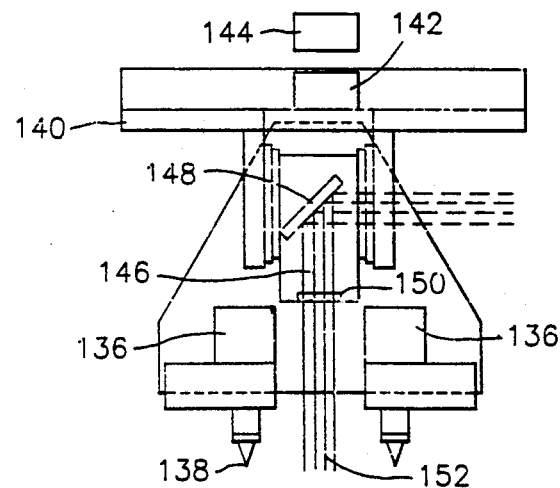
FIG. 10 is a front view of a preferred glue-applying apparatus with the machine of FIG. 9.

With reference to FIG. 10, a glue head 136 includes a nozzle 138 for dispensing glue, and head 136 is carried by a movable plate 140 of a linear motor 142. A guide rail 144 of the linear motor extends across the machine shown in FIG. 9, whereby glue nozzle 138 is caused to move along and directly above the joint between leg 20 and crease 32. A line of adhesive is deposited at that connection to secure the two parts together.

A unique technique for ensuring a secure connection is the use of a laser to heat the adhesive after it has been deposited by the nozzle 138. A beam 146, preferably from a 2000 watt carbon dioxide laser is directed onto a mirror 148 which is carried by movable plate 140 along with glue head 136. Beam 146 is passed through an anamorphic lens system 150 to form a linear focal line 152 on the line of glue laid down by nozzle 138. By spreading the beam out along the glue line to a width of approximately 25 to 50 mm, a large amount of energy can be transmitted to the glue without damaging the material.

The heating caused by the irradiation of the glue line 'drives' it into the material, thus ensuring a secure attachment of leg 20 to crease 32.

I claim:

1. A method of manufacturing an integral expandable, collapsible product having a row of parallelly arranged, transversely extending hollow cells therein, comprising the steps of:

folding a first sheet of flexible material to form a folded first sheet having a plurality of transverse folds therein, said plurality of transverse folds of said folded first sheet including a plurality of first folds which project to one side of the folded first sheet and a plurality of second folds which project to the other side of the folded first sheet, wherein the first folds alternate with the second folds such that adjacent ones of said transverse folds of the folded first sheet project to opposite sides of the folded first sheet;

folding a second sheet of flexible material to form a folded second sheet having a plurality of transverse folds therein, said plurality of transverse folds of said folded second sheet including a plurality of first folds which project to one side of the folded second sheet and a plurality of second folds which project to the other side of the folded second sheet, wherein the first folds alternate with the second folds such that adjacent ones of said transverse folds of the folded second sheet project to opposite sides of the folded second sheet;

forming a plurality of first legs on said folded first sheet, each of said first legs being formed by securing portions of said folded first sheet together adjacent one of the second folds, whereby each of said first legs projects from the same side of the folded first sheet;

feeding said folded first sheet and said folded second sheet toward one another such that said first legs of said folded first sheet project toward said folded second sheet and the second folds of said folded second sheet project toward the folded first sheet; and then securing each of said first legs of said folded first sheet to a respective second fold of said folded second sheet.

2. The method according to claim 1, wherein each of the first folds of the folded first sheet and each of the first folds of the folded second sheet is a creased pleat.

3. The method according to claim 2, wherein the step of forming the plurality of first legs on said folded first sheet comprises securing portions of said folded first sheet together adjacent each of the second folds of the folded first sheet.

4. The method according to claim 2, wherein alternate second folds of the folded first sheet are formed into first legs and wherein the remaining second folds of the folded first sheet are creased to form transverse creased pleats projecting to the same side of the folded first sheet as the first legs.

5. The method according to claim 1, further comprising the steps of forming a plurality of second legs on said folded second sheet, each of said second legs being formed by securing portions of said folded second sheet together adjacent one of the second folds thereof, whereby each of said second legs projects from the same side of the folded second sheet; and securing each of said second legs to a respective second fold of said folded first sheet.

6. The method according to claim 5, wherein alternate second folds of the folded first sheet are formed into first legs and the remaining second folds of the folded first sheet are creased to form transverse creased pleats projecting to the same side of the folded first sheet as the first legs; alternate second folds of the folded second sheet are formed into second legs and the remaining second folds of the folded second sheet are creased to form transverse creased pleats projecting to the same side of the folded second sheet as the second legs; and each of said first legs is secured to a respective creased second fold of the folded second sheet and each of said second legs is secured to a respective creased second fold of said folded first sheet.

7. The method according to claim 3, further comprising the steps of forming a plurality of second legs on said folded second sheet, each of said second legs being formed by securing portions of said folded second sheet together adjacent one of the second folds thereof, whereby each of said second legs projects from the same side of the folded second sheet; and securing each of said second legs to a respective first leg of said folded first sheet.

8. The method according to claim 1, wherein the step of forming each of said first legs comprises applying a line of adhesive within one of said second folds and then pressing the portions of said folded first material adjacent that second fold together.

9. The method according to claim 8, wherein the step of securing each of said first legs to the respective second fold of the folded second sheet comprises placing a line of adhesive along a contact line on the first leg, contacting the respective second fold of the folded second sheet with the line of adhesive along the contact line of on the first leg and then heating the line of adhesive to secure each first leg to the respective second fold of the folded second sheet.

10. The method according to claim 9, wherein said adhesive is a hot-melt adhesive and said step of heating comprises irradiating said adhesive with electromagnetic radiation.

11. The method according to claim 10, wherein said adhesive is irradiated with a laser beam forming a line on said adhesive.

* * * * *

UNITED STATES PATENT AND TRADEMARK OFFICE
CERTIFICATE OF CORRECTION

PATENT NO. : 5,205,891

DATED : April 27, 1993

INVENTOR(S) : CRAIG A. NEFF, of Golden, Colorado

It is certified that error appears in the above—identified patent and that said Letters Patent is hereby corrected as shown below:

Cover Page, [56] References
Cited, U.S. Patent Documents:   "--4,433,728 11/1984 Bauernfeind--" should read -- 4,483,728 11/1984 Bauernfeind --

Column 5, line 45:   "--operation--" should read -- rotation --

Column 6, line 14:   "--knife 62--" should read -- knife edge 62 --

Column 6, line 23:   "--are described--" should read -- as described --

Signed and Sealed this

First Day of February, 1994

*Attest:*

BRUCE LEHMAN

*Attesting Officer*    Commissioner of Patents and Trademarks